May 21, 1963
C. V. CLARK
3,090,153
FISHING KEEL
Filed Dec. 28, 1959
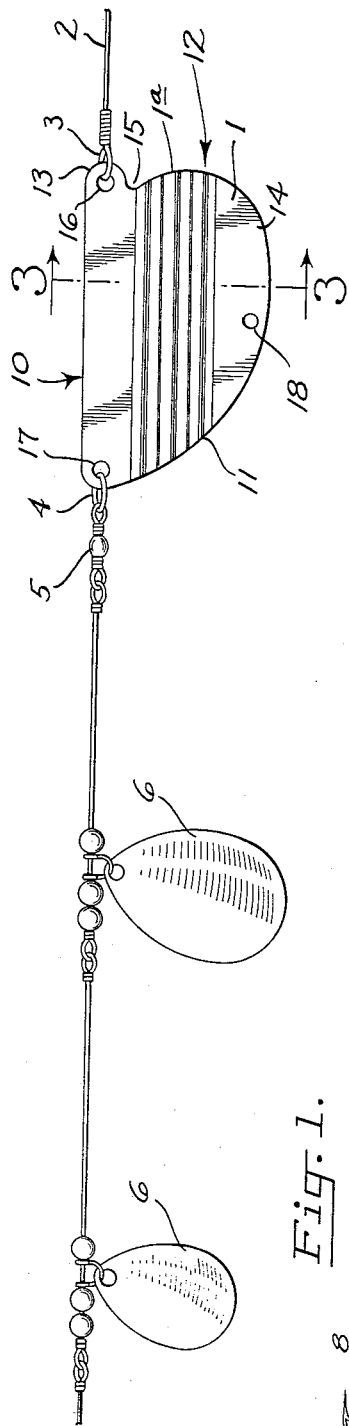
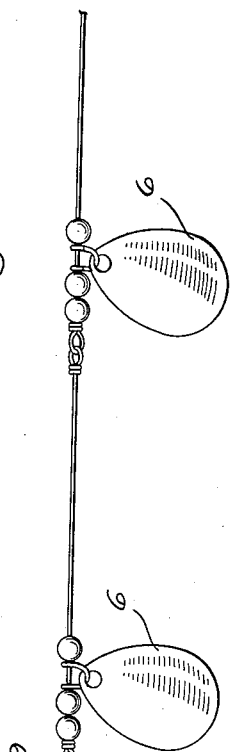
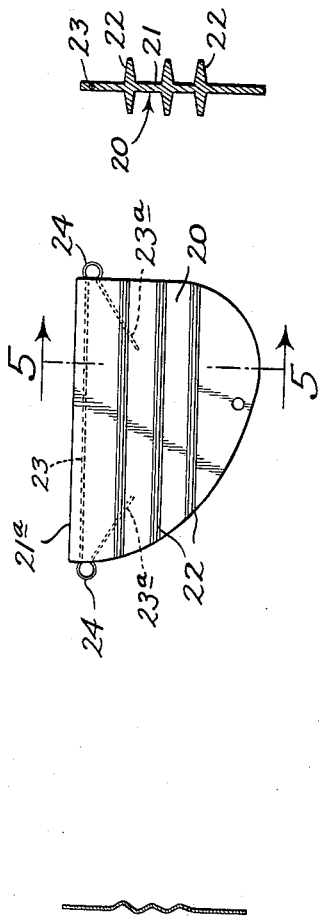
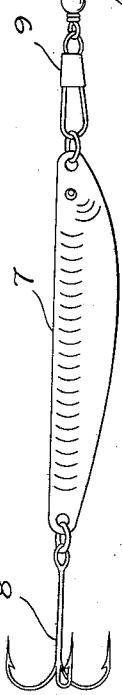
Cyrus V. Clark
INVENTOR.
BY Ramsey and Kolisch
Attys.

3,090,153
FISHING KEEL
Cyrus V. Clark, 56 Cooper Square, New York 3, N.Y.
Filed Dec. 28, 1959, Ser. No. 862,385
3 Claims. (Cl. 43—43.13)

My invention relates to a fishing device which is termed a keel or rudder which is in itself not a lure or bait but is used in connection with bait, hooks, flies, lures or spinners, all of which I will hereinafter group under the generic term "lure."

The object of this invention is to provide an improved keel or rudder which effectively prevents twisting or kinking of the fishing line when it is arranged intermediate the ends of said line and immediately forward of the lure.

I have discovered that all keels or rudders with which I am familiar are made of perfectly flat metal or plastic and that when the lure to which they are attached is drawn rapidly through the water and the lure or some of its component parts are spinning rapidly, these flat keels do not have the inherent stability to hold them in a straight level path and they frequently have a tendency to rotate in the same orbit that the lure or its components traverse, resulting in the twisting or kinking of the fishing line, thus defeating the purpose for which they are designed.

I have discovered that if horizontal fins, corrugations or flutes are provided in a keel, the keel follows a straight-ahead level path, even though the lure that trails it has pronounced lateral action, which is frequently desired. Thus, the stability thus afforded prevents the line from twisting or kinking and the action of the lure is controlled to that portion of the line or other line connections joining the keel with the lure. The horizontal fluting, channeling, ridges, folds, corrugations, grooves or fins which produce stability are so constructed that rotation, twisting or canting of the keel is inhibited when it is drawn through water. A keel or rudder is lightweight and does not constitute a weight or sinker. If it is desired that the lure run deep in the water, a weight or sinker may be attached thereto.

Further details of my invention, its mode of operation, and function thereof are hereinafter described with greater particularity and in connection with the drawings, in which:

FIG. 1 shows that part of the fishing line joined to the keel and the link connections between the keel and the trailing lures;

FIG. 2 is a fragment of the line joining the lures, such as spinners or wobblers, and an artificial bait which carries a hook at the trailing terminal end of the line;

FIG. 3 is a transverse section through a keel embodying my invention taken on the line 3—3 in FIG. 1;

FIG. 4 is an elevation of a modification of a keel embodying my invention; and

FIG. 5 is a sectional view of said modification taken on the line 5—5 in FIG. 4.

A keel 1, embodying my invention is adapted to be secured to a fishing line 2, by a ring or loop 3. The keel is joined to a trailing lure by a ring 4, preferably joined to a swivel 5. The swivel is secured to any type of lure, but in the drawing such lure is exemplified by plural spinners 6, arranged in tandem. Trailing said spinners is a common type of lure such as an artificial fish 7, which has a hook 8, joined thereto. The artificial fish is shown in FIG. 2 as joined to the spinners by a snap connection 9.

Spinners usually cause twist in a line even though swivels are arranged intermediate their point of joinder with the remainder of the line. The spinners have "action" when they are trolled in the water. They also respond to the length of the line and thus when the length of line is varied the action of the spinners vary. If a rudder or keel 1, is placed immediately in advance of the lure, it tends to limit the articulation or lateral play of the lure to the swing of the connection between the keel or rudder and the lure. This is premised upon the fact that the keel or rudder runs true, that is, in a straight line and level.

I have observed that said keels, if plane, frequently rotate or cant particularly if they are joined by a swivel connection to the lure, which is common. I have discovered that if lateral fins or flutes are provided for the keel or rudder that run longitudinally of the keel and parallel with the line of pull of the line and are of proper amplitude that the keel is inhibited from moving out of a vertical plane. As is shown in FIG. 1, the keel has horizontal flutes or corrugations 1a, which extend the longitudinal dimension of the keel or rudder. By longitudinal dimension I mean that which spans the points of joinder between the pulling line and the lure.

Said keel is quite broad and hangs pendent in the water between its points of joinder. Said flutes or corrugations should be equidistant laterally from the plane of the keel, as is illustrated in FIG. 3. I have determined that said flutes, corrugations or fins should be offset from the median plane of this section a distance greater than twice the thickness of the section. In using the term "twice the thickness of the section" I refer to the overall and total offset in both directions from the median plane of the keel. In the drawings it will be noted that the offset is probably three or four times the thickness of the central plane or body of the keel or rudder.

If the keel or rudder is made of a relatively thin sheet of metal such, for example, as brass, said flutes or fins are formed by corrugations of uniformly undulating conformation.

At the upper edge of the keel, as it runs through the water and as shown in elevation in FIG. 1, said keel is bounded by a straight edge 10, an arcuate trailing edge 11, and a doubled lobed forward edge 12. The uppermost lobe 13, is substantially smaller than the lowermost lobe 14. Intermediate to said lobes is an indentation 15, which lies immediately above the uppermost of plural corrugations 1a. The uppermost lobe is pierced at 16 for the fishing line connection and adjacent the point of joinder of the straight edge 10, and the arcuate trailing edge 11, and substantially equidistant from said straight edge is an aperture 17, through which the connection to the lure is secured by ring 4.

Below the corrugations and adjacent the lowermost portion of the keel is an aperture 18, to which a line carrying a sinker may be secured (not shown). The aperture 18, is adjacent the lower edge and well below the corrugations 1a. It is located longitudinally of the keel at about its midpoint so as to maintain the balance of the keel. As I have pointed out, the use of such a weight is only to cause the keel and the lure secured thereto to run deep in the water if it is desired.

In FIGS. 4 and 5, I have illustrated one form of the keel or a rudder 20, as constructed of plastic or other nonmetallic substance. It has generally the peripheral outline of the embodiments shown in FIGS. 1 to 3, inclusive. That is to say, it has a central web 21, having plane sides and fins or flutes 22, extending laterally thereof a distance substantially three or four times the thickness of the central web 21. As is shown in FIG. 5, this keel or rudder is symmetrical about its longitudinal central plane and the fins or flutes 22, extend the full length of the keel or rudder, as is shown in FIG. 4. Imbedded along the straight upper edge 21a of the web, but inwardly thereof is a bent wire 23, which defines projecting eyes 24, both at the forward edge as well as the trailing edge of said web. The ends 23a of the wire are reversely bent and imbedded in the web at an oblique angle, as is shown in dotted outline in FIG. 4.

These two embodiments of my invention are intended as illustrative of several forms which my invention may take and I do not wish to be limited to the particular devices as shown except as defined in the following claims.

It is claimed and desired to secure by Letters Patent:

1. A keel for a fishing line adapted to be secured intermediate the ends thereof and forwardly of a lure secured to a trailing end of the line, said keel comprising a thin elongated section of material of substantial breadth and having an upper edge, eye members at both ends thereof adjacent said upper edge, and plural equally spaced uniform longitudinal corrugations thereon, located below the eye members and extending the full length of said keel, each of said corrugations being offset from the median plane of said section a distance equal to that of the other corrugations and greater than twice the thickness of said section.

2. A keel for a fishing line adapted to be secured intermediate the ends thereof and forwardly of a lure secured to the trailing end of the line, said keel comprising a thin elongated section of material of substantial breadth, eye members at both ends thereof, and plural equally spaced uniform longitudinal corrugations thereon, located below the eye members and extending the full length of said keel, each of said corrugations being offset from the median plane of said section a distance equal to that of the others, and greater than twice the thickness of said section, the periphery of said keel defining a straight upper edge, an arcuate trailing edge and a double-lobed forward edge, said edges defining a smooth surface, the eye members being arranged adjacent the ends of the straight upper edge.

3. A keel for a fishing line adapted to be secured intermediate the ends thereof and forwardly of a lure secured to the trailing end of the line, said keel comprising a thin elongated section of material of substantial breadth, having eye members at both ends thereof, and a series of equally spaced uniform longitudinal corrugations thereon, located below the eye members and extending the full length of said keel, said corrugations being offset from the median plane of said section a distance greater than twice the thickness of said section, the periphery of said keel defining a straight upper edge, and a forward edge defining an upper and a lower lobe, said edge defining a smooth surface, the eye members being arranged adjacent the ends of the straight upper edge, the opening of one of said eye members being generally concentric within the uppermost lobe of the forward edge of said keel.

References Cited in the file of this patent

UNITED STATES PATENTS

| | | |
|---|---|---|
| D. 100,482 | Tripp | July 21, 1936 |
| 1,463,858 | Wandve | Aug. 7, 1923 |
| 1,802,295 | Wear | Apr. 21, 1931 |
| 2,065,246 | Saarinen | Dec. 22, 1936 |
| 2,106,045 | Zamborsky | Jan. 18, 1938 |
| 2,219,886 | Blomme | Oct. 29, 1940 |
| 2,503,607 | Arff | Apr. 11, 1950 |
| 2,825,994 | Bruhn | Mar. 11, 1958 |
| 2,856,723 | Bruington | Oct. 21, 1958 |